(12) United States Patent
Mao et al.

(10) Patent No.: US 6,970,617 B2
(45) Date of Patent: Nov. 29, 2005

(54) RECONFIGURABLE SERVICE RING AND METHOD FOR OPERATION IN OPTICAL NETWORKS

(76) Inventors: Charles Mao, 5601 Cradlerock Cir., Plano, TX (US) 75093; Lintao Zhang, 3905 Harlington La., Richardson, TX (US) 75082; Guohua Xiao, 7213 Regency Ct., Plano, TX (US) 75024

( * ) Notice: Subject to any disclaimer, the term of this patent is extended or adjusted under 35 U.S.C. 154(b) by 74 days.

(21) Appl. No.: 10/337,200

(22) Filed: Jan. 7, 2003

(65) Prior Publication Data

US 2004/0131308 A1 Jul. 8, 2004

(51) Int. Cl.[7] .......................... H04J 14/00; G02B 6/28
(52) U.S. Cl. .................................... 385/24; 398/59
(58) Field of Search ...................... 385/24; 398/59, 398/79

(56) References Cited

U.S. PATENT DOCUMENTS

| | | | |
|---|---|---|---|
| 6,404,940 B1 * | 6/2002 | Tsuyama et al. | 385/17 |
| 6,583,901 B1 * | 6/2003 | Hung | 398/79 |
| 6,785,472 B1 * | 8/2004 | Adams et al. | 398/79 |

* cited by examiner

Primary Examiner—Frank G. Font
Assistant Examiner—Charlie Peng

(57) ABSTRACT

An optical reconfigurable service ring (RSR) architecture based on a RSR channel and WDM channel plan matrix, and method for operation in a fiber network that provides WDM wavelength networking functionalities such as provisional wavelength services, optical circuit switching, optical layer 2 packet switching, optical storage switching, and optical layer 3 packet routing, are proposed. In one embodiment, sixteen wavelength are dynamically switching, routed, or distributed among five optical add/drop nodes using narrowly wavelength tunable transmitters and fixed optical add/drop multiplexer modules.

8 Claims, 8 Drawing Sheets

| Service Node | Service Demand A |
|---|---|
| N1 | 3 channels $\lambda_{1,1}, \lambda_{2,1}, \lambda_{3,1}$ |
| N2 | 1 channel $\lambda_{4,2}$ |
| N3 | 5 channels $\lambda_{5,3}, \lambda_{6,3}, \lambda_{7,3}, \lambda_{8,3}, \lambda_{9,3}$ |
| N4 | 4 channels $\lambda_{10,4}, \lambda_{11,4}, \lambda_{12,4}, \lambda_{13,4}$ |
| N5 | 0 channel |

85

86 Software provision transmitters ↑

| | Service Demand B |
|---|---|
| | 4 channels $\lambda_{1,1}, \lambda_{2,1}, \lambda_{3,1}, \underline{\lambda_{8,1}}$ |
| | 2 channel $\lambda_{4,2}, \underline{\lambda_{9,2}}$ |
| | 3 channels $\lambda_{5,3}, \lambda_{6,3}, \lambda_{7,3}$ |
| | 4 channels $\lambda_{10,4}, \lambda_{11,4}, \lambda_{12,4}, \lambda_{13,4}$ |
| | 1 channels $\underline{\lambda_{14,5}}$ |

*FIG. 4*

RECONFIGURABLE SERVICE RING AND METHOD FOR OPERATION IN OPTICAL NETWORKS

BACKGROUND INFORMATION

1. Field of the Invention

The present invention relates to the field of optical networks, and particularly to constructing a reconfigurable service ring (RSR) in metropolitan optical networks.

2. Description of Related Art

At present, metropolitan networks interconnect service nodes by using dense wavelength division multiplexer (DWDM) and optical add drop multiplexing (OADM) technologies. The drive is for the capacity boost, per bit dollar cost reduction, and for the fundamental shift in replacing the voice-centric, hard-to-scale, and slow-to-provision digital network with a data-centric, scalable, and easy-to-provision optical network.

An OADM optical ring network typically consists of a central hub and two to eight OADM nodes interconnected by optical fibers. Optical wavelengths are multiplexed together at the hub using DWDM multiplexer (mux), then transmitted along the optical fiber ring, with certain number of wavelengths being dropped and added back at each OADM node. The composite DWDM signal back to the hub is demultiplexed using DWDM demultiplexer (demux) and each wavelength goes to an optical receiver. There are two types of OADM ring technologies: one is fixed OADM where fixed wavelength transmitters are used at the hub and each OADM node adds/drops pre-defined fixed wavelengths using totally passive optics; the other is reconfigurable OADM (ROADM) where tunable wavelength transmitters are used at the hub and each OADM node can configure or change its adds/drops wavelengths using various active optical means. Fixed OADM ring networks are widely deployed in the metropolitan networks as data traffic boom creates the demand for more bandwidth and protocol transparent transport platform, and passive fixed OADM modules are technologically mature since it uses the same technologies as the widely deployed DWDM mux and demux. However, reconfigurable OADM ring offers more flexibility and savings for network planning and operation. No truck rolls are needed when carrier needs to change wavelengths among the OADM nodes. As metropolitan data service heats up and carrier's spending is tightly restricted due to the bust of telecom bubble, these dynamic reconfigurability and operation expense (OPEX) savings become more and more important. Unfortunately, ROADM has not been widely deployed because today's ROADM product all suffers the shortcomings of high cost and unproven technology risk, because they require widely tunable lasers and ROADM module, both are not yet widely deployed in the field.

Accordingly, it is desirable to have an OADM solution that has about the same cost level of today's fixed OADM but offers the operation flexibility and savings of ROADM.

SUMMARY

The invention discloses a unique WDM channel plan matrix, an optical reconfigurable service ring architecture, and method for operation in a metropolitan network that provides WDM wavelength networking functionalities such as provisional wavelength services, optical circuit switching, optical layer 2 packet switching, optical storage switching, and optical layer 3 packet routing. The optical reconfigurable service ring is designed with capabilities for wavelength/channel routing, tuning, add/drop, optical circuit switching, optical layer 2 packet switching, optical storage switching, and optical layer 3 packet routing functionalities without requiring any immature and expensive widely tunable lasers and reconfigurable optical add/drop multiplexers OADMs. In one embodiment, sixteen wavelengths are dynamically switched, routed or distributed among five optical add/drop nodes using commercially available narrowly tunable transmitters and fixed OADM modules.

Advantageously, the reconfigurable service ring or RSR in the present invention produces a more flexible yet low cost OADM ring, with the capability of optical switching or routing. The present invention also advantageously does not rely on the cost-forbidden reconfigurable OADM modules and the expensive and not-yet-commercial ready widely tunable lasers.

Other structures and methods are disclosed in the detailed description below. This summary does not purport to define the invention. The invention is defined by the claims.

BRIEF DESCRIPTION OF THE DRAWINGS

FIG. 4 is a tabular diagram illustrating an example of a metropolitan network service demand change in accordance with the present invention.

DETAILED DESCRIPTION

Figure 1A:
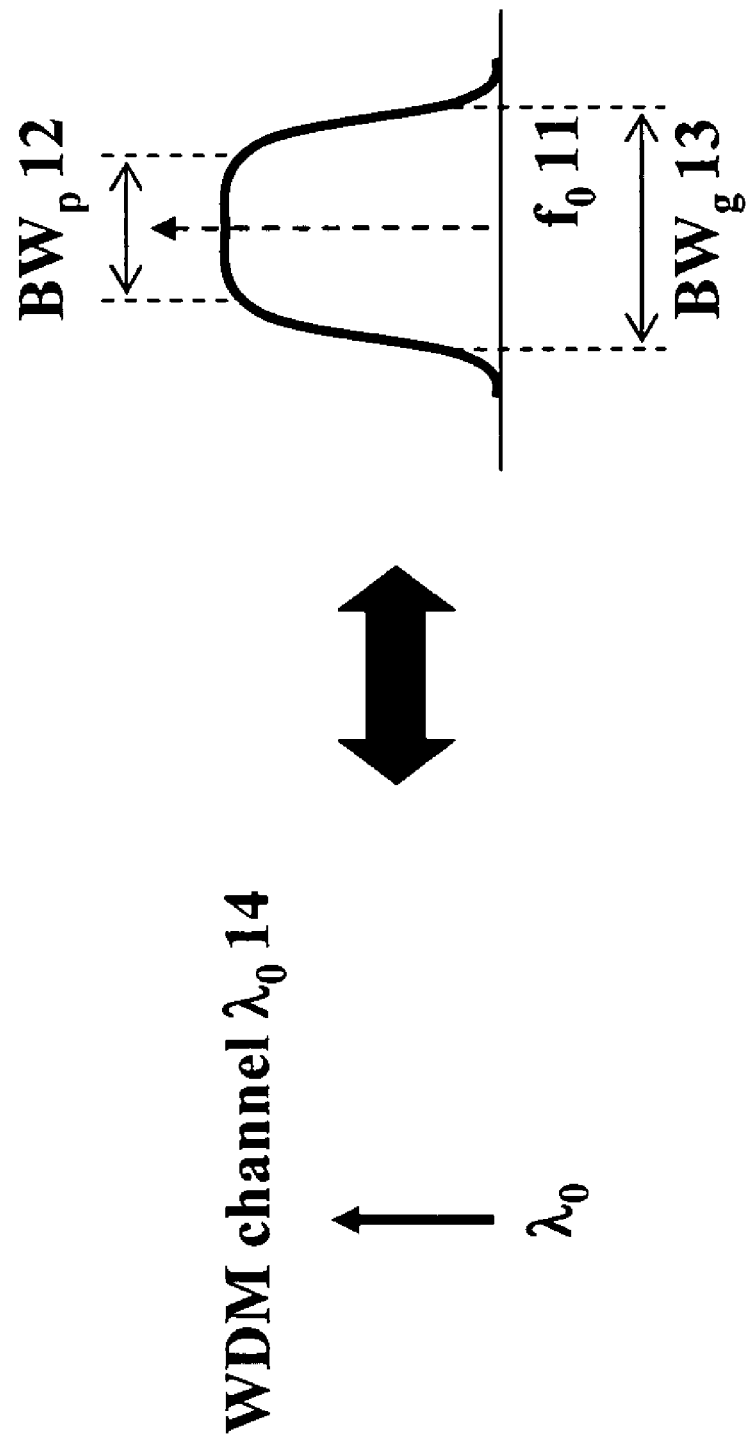
FIG. 1A is a graphical diagram illustrating the WDM channel definition in accordance with the present invention.
Figure 1B:
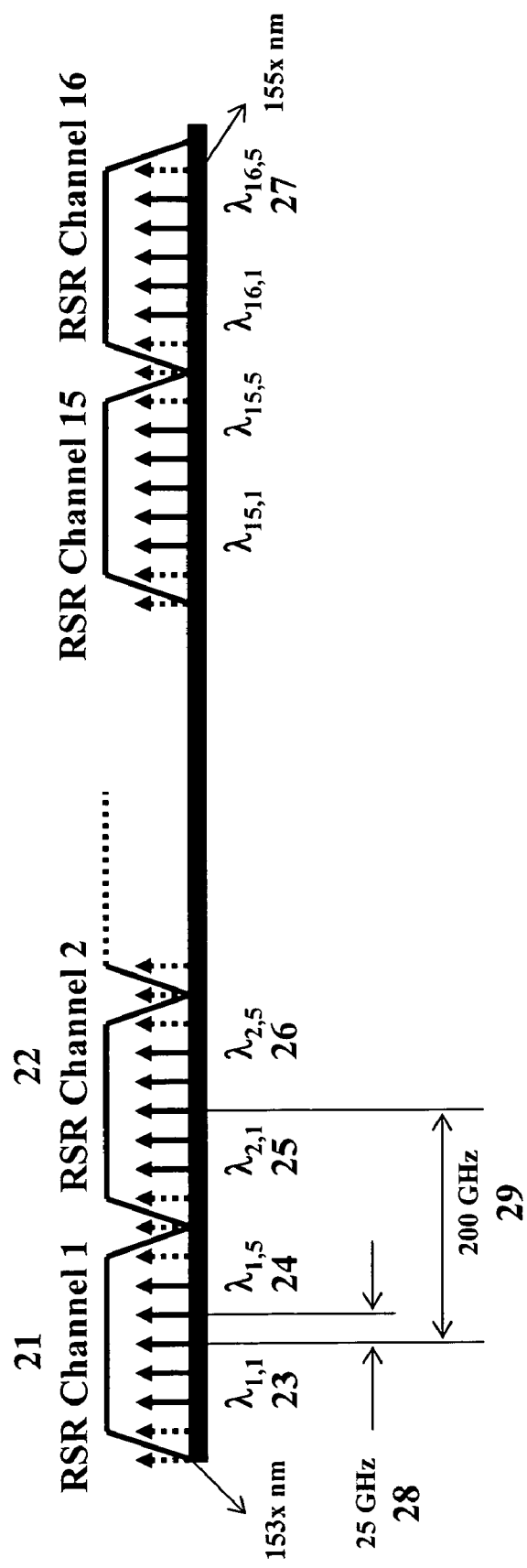
FIG. 1B is a graphical diagram illustrating the RSR channel definition and channel plan example in accordance with the present invention.
Figure 3:
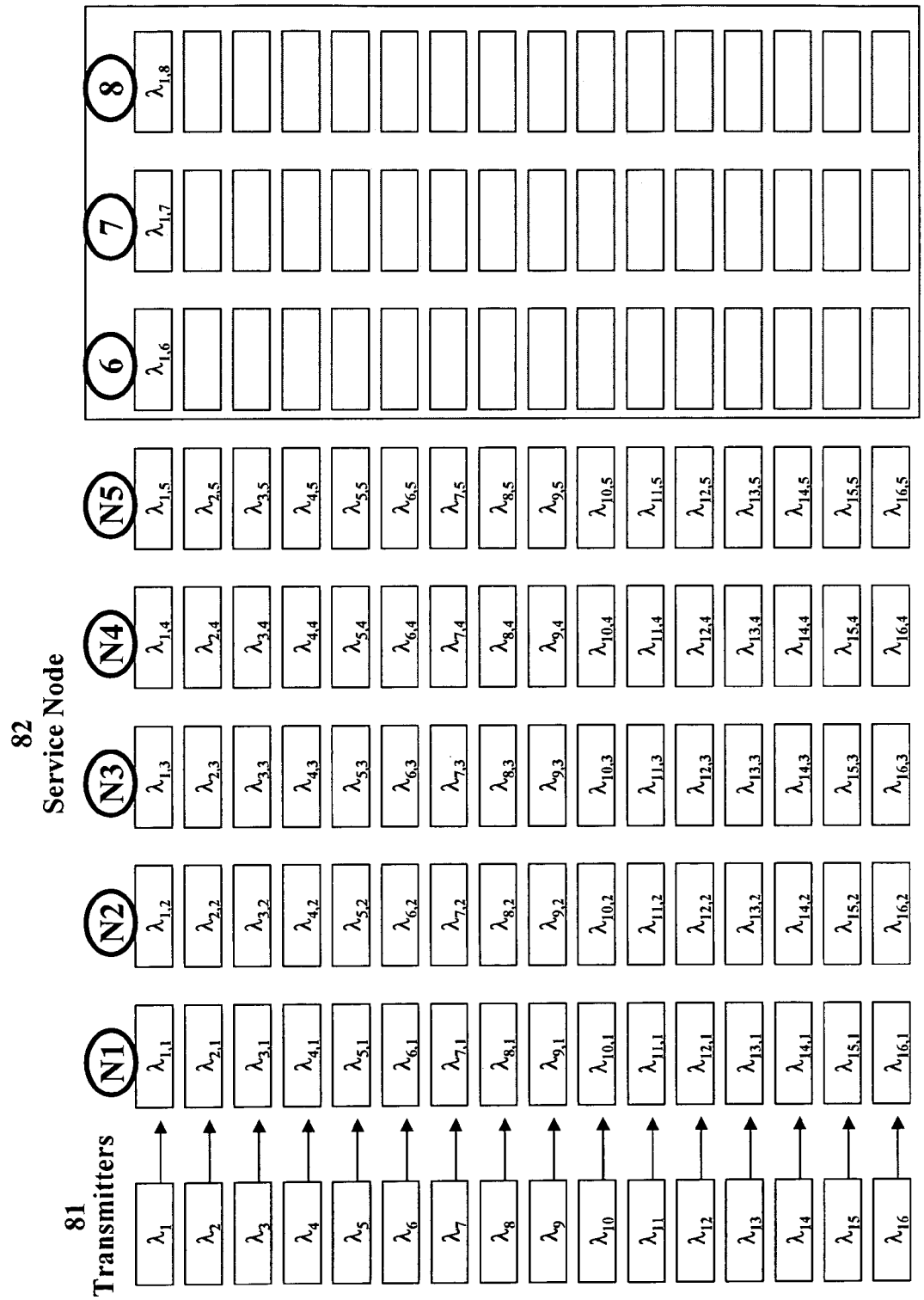
FIG. 3 is a graphical diagram illustrating a RSR channel plan matrix in accordance with the present invention.

FIG. 1A and FIG. 1B are graphical diagrams illustrating the channel definitions and channel plan example used in the current invention. In FIG. 1A, a WDM channel $\lambda_0$ 14 is defined by its center frequency $f_0$ 11 along with a passband $BW_p$ 12 and a guardband $BW_g$ 13. This WDM channel definition is widely used in optical WDM communications. The key to the current invention is that in addition to WDM channel 10, a RSR channel 20 is defined. The C and/or L and/or S wavelength band in optical communications is divided into x number of equally spaced sections with y GHz frequency spacing between adjacent sections. Each section is defined as a RSR channel. Unlike a WDM channel, which is defined by frequency $f_0$ 11, passband $BW_p$ 12, and guardband $BW_g$ 13, a RSR channel is defined by the WDM channels it contains and skips. FIG. 1B shows an example of 16 RSR channels spaced at 200 GHz 29 apart across C band. The WDM channels $\lambda_{1,1}$ 23, . . . $\lambda_{16,5}$ 27 in this case are spaced at 25 GHz 28 apart. So each RSR channel contains 8 WDM channels. Due to limitations of optical demultiplexing technologies, a RSR channel may choose to exclude or skip certain number of WDM channels at its spectral edges. These skipped WDM channels serve as guardband to ease the demand on RSR channel demultiplexer. Alternatively, one can insert additional guard band into adjacent RSR channels in order to facilitate the use of thin film filter based demultiplexing technology. In FIG. 1B, 3 WDM channels out of 8 are skipped, shown in dashed lines. The RSR channel in this case is 8 skip 3, implying 5 WDM channels are included in 1 RSR channel. So RSR Channel 1 21 includes 5 WDM channels $\lambda_{1,1}$ 23 till $\lambda_{1,5}$ 24, and RSR Channel 2 22 (or just Channel 2 for short) includes $\lambda_{2,1}$ 25 till $\lambda_{2,5}$ 26. The n skip m RSR channel plan solely depends on demux technology feasibility and product cost factor. For example, if 25 GHz RSR demux is chosen for FIG. 1B, then the RSR channel becomes 8 skip 0, including all 8 WDM channels within its range.

Although an 8 skip 3 RSR channel includes 5 WDM channels, it uses only 1 of the 5 WDM channels at a time. Therefore, a RSR channel has the same passband and guardband as the WDM channels it includes, only that its center frequency has several possible values. Depending on network planning, a RSR channel can be provisioned (i.e., tuned by software) to any one of its WDM channels. One way to implement this is to use a temperature tuned DWDM transmitter. A DWDM DFB (distributed feedback) laser has a temperature tuning efficiency of about 10 GHz/° C. To tune the laser transmitter across 5 WDM channels with 25 GHz spacing, the laser temperature only needs to be tuned by 10° C. Currently, the commercial DWDM lasers all offers an operating temperature range minimum from 0 to 50° C. So it is quite feasible to tune off-the-shelf commercial DWDM lasers by 10° C.

Figure 2:
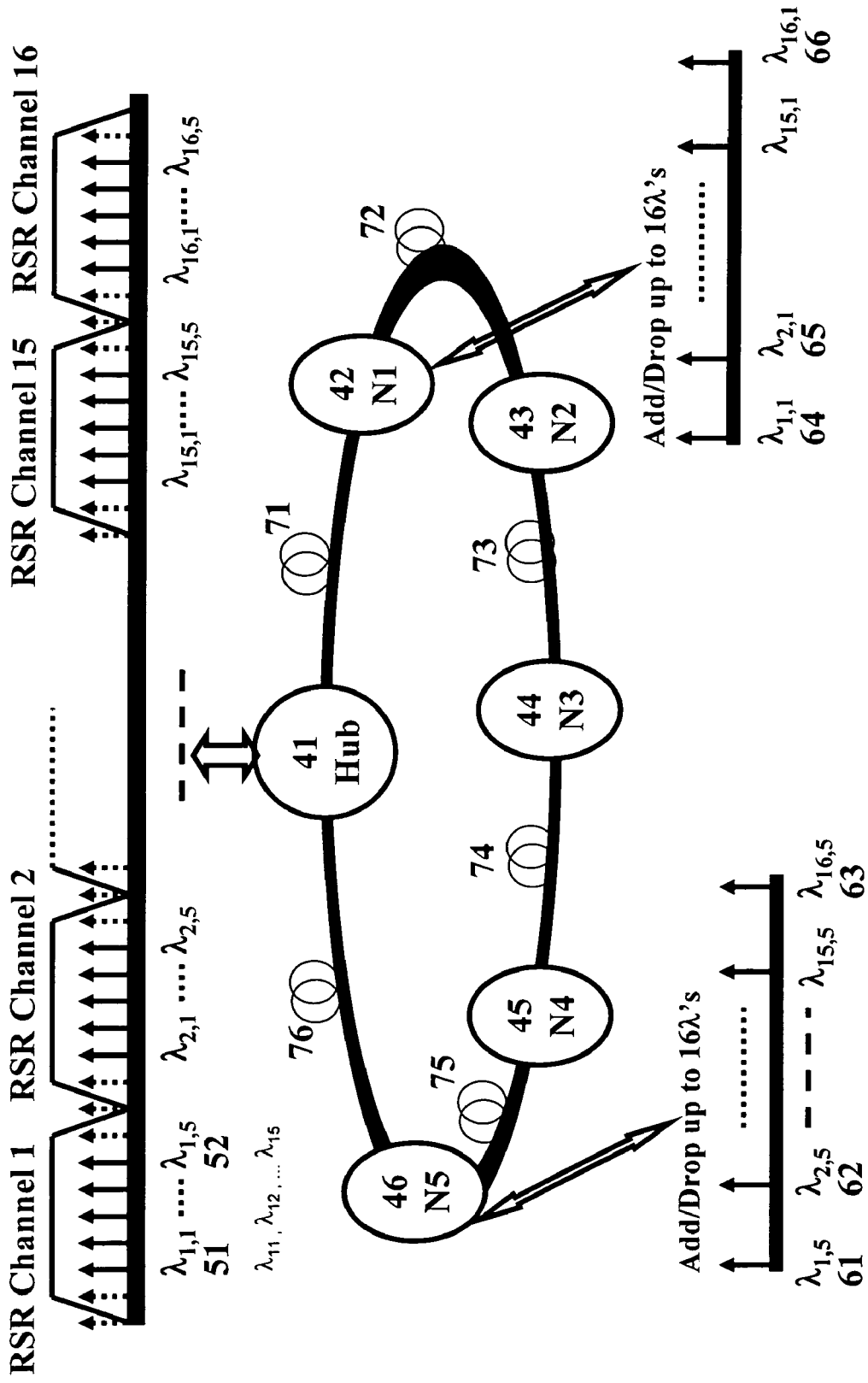
FIG. 2 is an architectural diagram illustrating a RSR in accordance with the present invention.

FIG. 2 is an architectural diagram illustrating a reconfigurable service ring (RSR) configuration 30 for metropolitan networks. The RSR configuration 30 includes one gateway hub 41, five service nodes N1 42, N2 43, N3 44, N4 45, N5 46, and optical fiber spans 71, 72, 73, 74, 75, 76 in between nodes and hub. At the hub 41, up to 16 RSR channels are multiplexed together and the composite signal is sent clockwise along the ring. At each service node, a fixed OADM drops 16 WDM channels from the 16 RSR channels. The fixed OADM at each service node also adds different set of WDM channels. In FIG. 2, service node N1 42 drops/adds the first WDM channel in all 16 RSR channels: $\lambda_{1,1}$ 64, $\lambda_{2,1}$ 65, till $\lambda_{16,1}$ 66; and service node N5 46 drops/adds the fifth or the last WDM channel in all 16 RSR channels: $\lambda_{1,5}$ 61, $\lambda_{2,5}$ 62, till $\lambda_{16,5}$ 63. Since each RSR channel only uses one WDM channel at a time, each RSR channel is dropped/added by only one service node; depending on which WDM channel it is tuned to. If RSR channel 1 is tuned to its first WDM channel $\lambda_{1,1}$ 51, it will reach service node N1 42; if it is tuned to its fifth WDM channel $\lambda_{1,5}$ 52, it will reach service node N5 46. After going through all 5-service nodes, the composite DWDM signal goes back to gateway hub 41 and the 16 RSR channels as they added from each service node are demultiplexed.

This RSR configuration 30 combines the wavelength selective nature of fixed OADM nodes with the narrow band tunability of RSR channels to constitute a service ring that can be reconfigurable via software. The advantages of RSR are as follows:

First, RSR offers much more flexibility, with quite minor cost increase, than current fixed OADM ring configuration, where each WDM channel is fixed to go to its designated OADM node. RSR allows all of its RSR channels to go to any nodes on the ring by tuning to different WDM channels;

Secondly, RSR is at low risk in technology as well as cost effective comparing to existing reconfigurable OADM ring configurations. ROADM rings require expensive and immature ROADMs (which normally consist of optical switches and tunable filters) and widely tunable transmitters. Both are not yet field proven. Whereas RSR only requires fixed OADM based on passive WDM technologies such as thin-film filter or fiber Bragg grating etc. and narrowly tunable transmitters which can be implemented via temperature tuning of commercial DWDM lasers;

Thirdly, RSR allows better wavelength tolerance for its passive WDM mux, demux, and OADMs. In RSR architecture, RSR channels are spaced much further apart than the narrowly spaced WDM channels. In the example shown here, RSR channels are 200 GHz apart, and WDM channels are 25 GHz apart. A RSR channel is tuned to only one of its WDM channels, its WDM channels do not need to be precisely on its center frequency, since all adjacent WDM channels will not be occupied. The alignment of transmitter and WDM channels can be done during initialization of the system, where all transmitters are tuned to locate and remember all the WDM channels it includes. This will ease greatly the demand on passive mux, demux, and OADM manufacturing yield, and thus reducing their cost. The only exception is that if RSR channels are x skip 0, with no guard WDM channels in between RSR channels, then all edge WDM channels need to be precisely on grid to avoid adjacent channel interferences;

Fourthly, RSR has no channel interference problem during its reconfiguration. For existing ROADM scheme, when tunable transmitter is tuned from channel A to channel B for reconfiguration, its wavelength will sweep through traffic-bearing live channels in between channel A & B. To avoid interferences, these in between channels need to shutter themselves off right at the moment when the tuning transmitter hits and quickly re-open to avoid traffic loss. Not a trivia task to perform. RSR has no such problem, because RSR channels are only tuned among its inclusive WDM channels. Each RSR channels have different inclusive WDM channels. So the reconfiguration tuning never sweeps through any traffic bearing live channels. No synchronized receiver quick shutter is needed;

Last but not the least, RSR architecture can be used for optical circuit and packet switching including optical storage switching and optical packet routing, in addition to wavelength provisioning. Since all RSR transmitters can reach all nodes on the ring via setting to specific corresponding wavelength, it can read destination node from each packet's header, determined the destination node of this packet, and tune/switch the laser to the corresponding wavelength, thus switch/route packets to their designated nodes. In case of circuit switching, the RSR transmitter can switch each TDM (time division multiplexing) time slot to its destination node by switching to the corresponding wavelength according to optical cross connect (OXC) provision. The key for successful implementation of optical switching/routing on RSR is the wavelength switching or tuning speed of transmitter in comparison to the speed of input traffic signal. For wavelength service provisioning, temperature tuned transmitter of several seconds tuning time is fast enough. For optical switching/routing on RSR, transmitter wavelength must be switched much faster (one order of magnitude) than the speed of traffic signal. Possible candidate is ultra-fast nanosecond speed tunable laser such as distributed Bragg reflector (DBR) lasers. The capability of optical switching and routing of RSR means that RSRs deployed in metropolitan areas can perform the present network functions while using much smaller capacity centralized OXC and/or core router, thus further reducing the cost and maintenance cost of the overall network.

FIG. 3 to FIG. 5B illustrates an application example for the FIG. 2 RSR architecture in metropolitan networking. Following the 8 skip 3 RSR channel plan of FIG. 2 30, FIG. 3 80 illustrates the channel plan or wavelength grid matrix for this RSR. 16 RSR channels are implemented by 16 transmitters 81 $\lambda_1$, $\lambda_2$, till $\lambda_{16}$. Each transmitter can be tuned to 1 of 5 wavelengths which are located on 5 corresponding service nodes 82 N1, N2, N3, N4, N5. Please note that although 80 wavelengths are present on the matrix, only up to 16 wavelengths may be used at a time, since there are only 16 transmitters. In principle, the number of wavelengths over number of transmitters gives rise to the maximum number of network nodes to be serviced. Reduced wavelength tuning range from each transmitter is assured by the proposed wavelength matrix as the maximum tuning range to one RSR channel, or eight adjacent WDM channel (200 GHz in example). Furthermore, a fixed OADM at each node can be implemented by following the wavelength or channel plan per its column in FIG. 3 80.

Figure 5A:
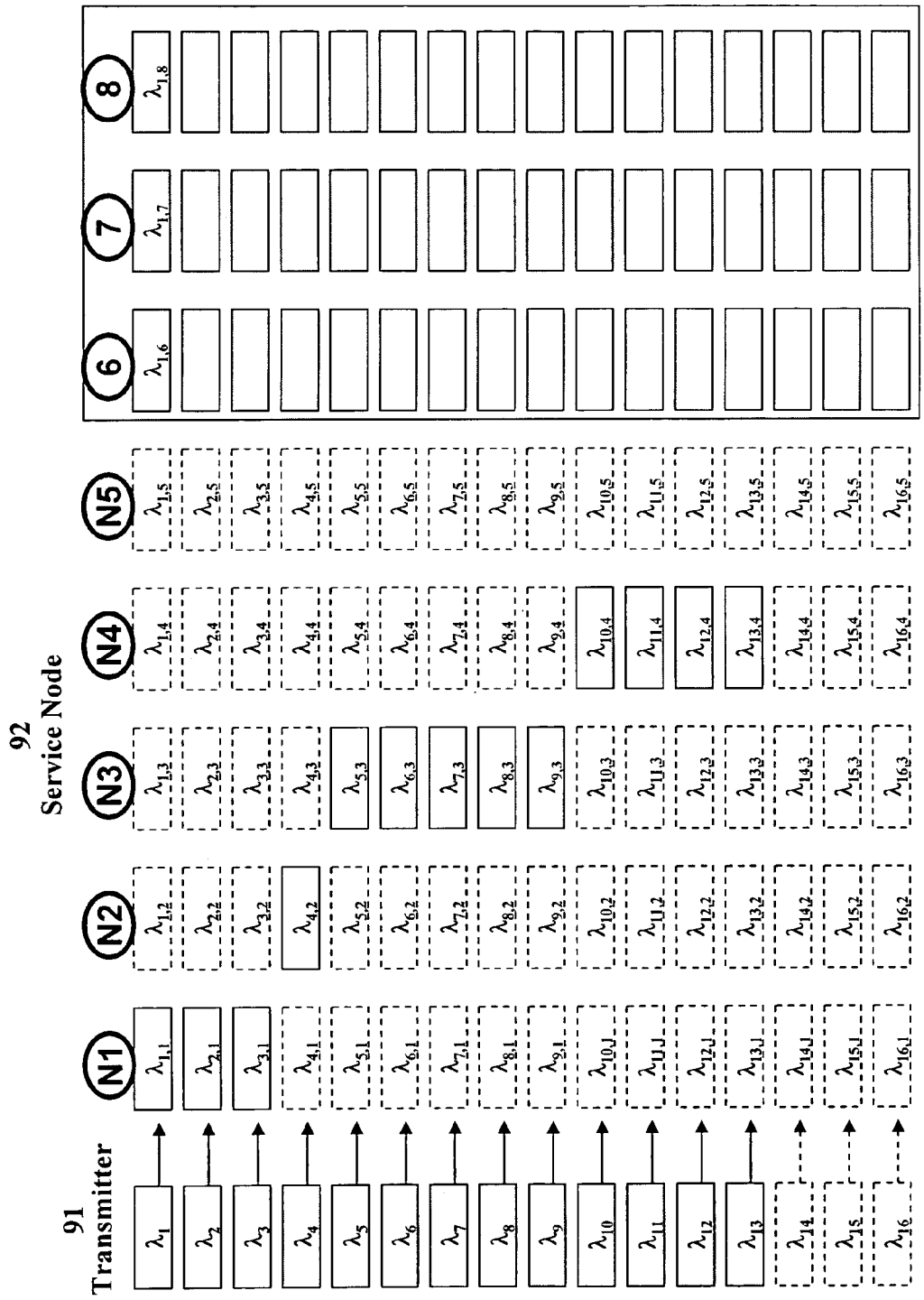
FIG. 5A is a graphical diagram illustrating a RSR channel plan matrix for one service demand in accordance with the present invention.
Figure 5B:
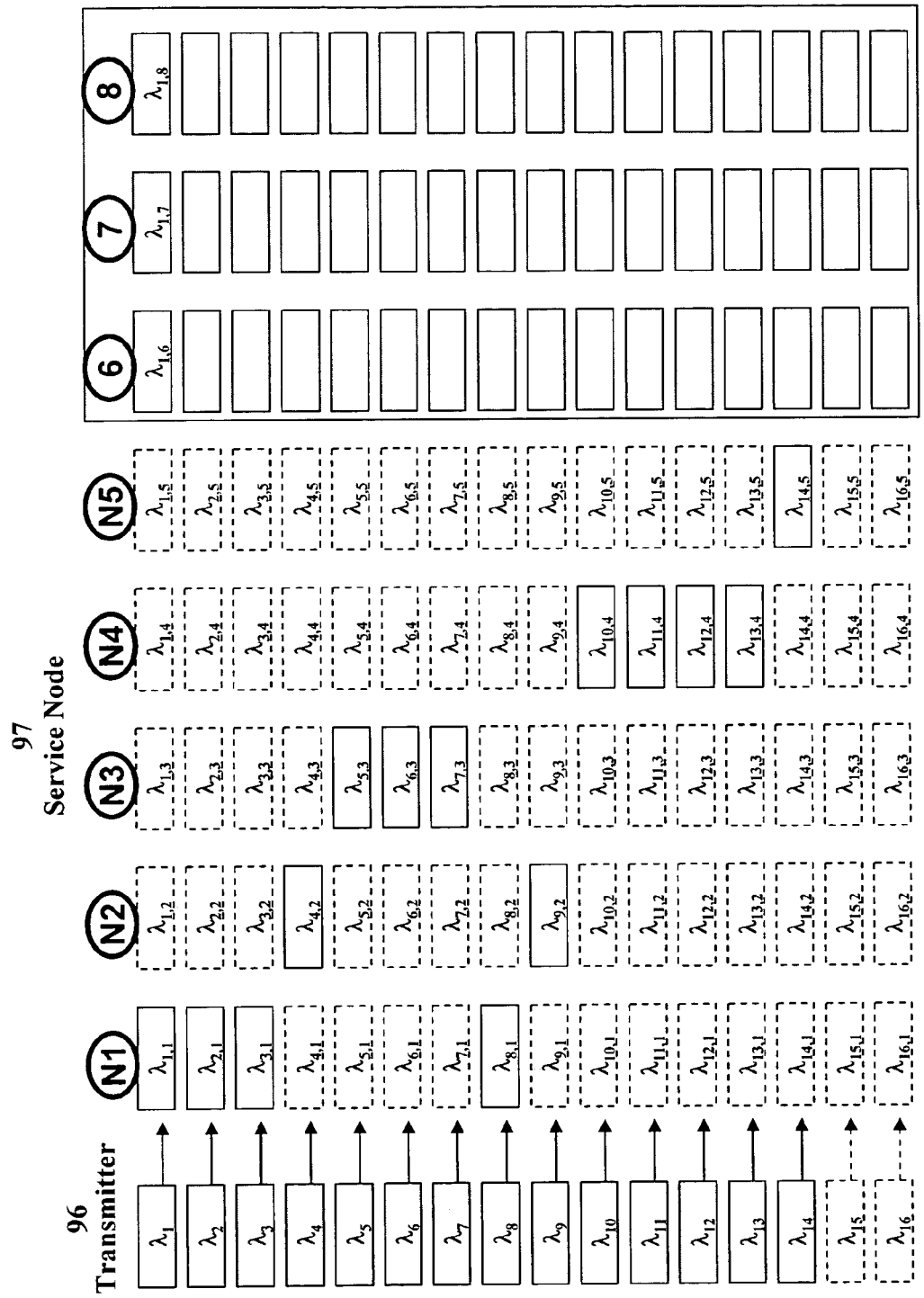
FIG. 5B is a graphical diagram illustrating a RSR channel plan matrix for another service demand in accordance with the present invention.

FIG. 4 85 is an example of service demand change from A to B. Service demand A requires that node N1, N2, N3, N4, N5 to have 3, 1, 5, 4, 0 channels, respectively. And service demand B requires that node N1, N2, N3, N4, N5 to have 4, 2, 3, 4, 1 channels, respectively. Such a service demand change can be done through a set of software provision transmitters 86. FIG. 5A 90 illustrates the wavelength matrix for service demand A: 13 transmitters 91 $\lambda_1$, $\lambda_2$, till $\lambda_{13}$ are tuned to 13 different channels to meet the demand. Service node 92 N1 has $\lambda_{1,1}$, $\lambda_{2,1}$, and $\lambda_{3,1}$; N2 has $\lambda_{4,2}$; etc. No transmitter reaches node N5. To reconfigure this RSR to satisfy service demand B at each service node 97, the operator only needs to set the transmitter 96 for the original 13 wavelengths per FIG. 5B 95. The two extra transmitters on node N3 $\lambda_{8,3}$ and $\lambda_{9,3}$ are tuned to node N1 $\lambda_{8,1}$ and node N2 $\lambda_{9,2}$, respectively. And one more transmitter $\lambda_{1,4}$ is turned on to serve node N5 $\lambda_{14,5}$.

Figure 6:
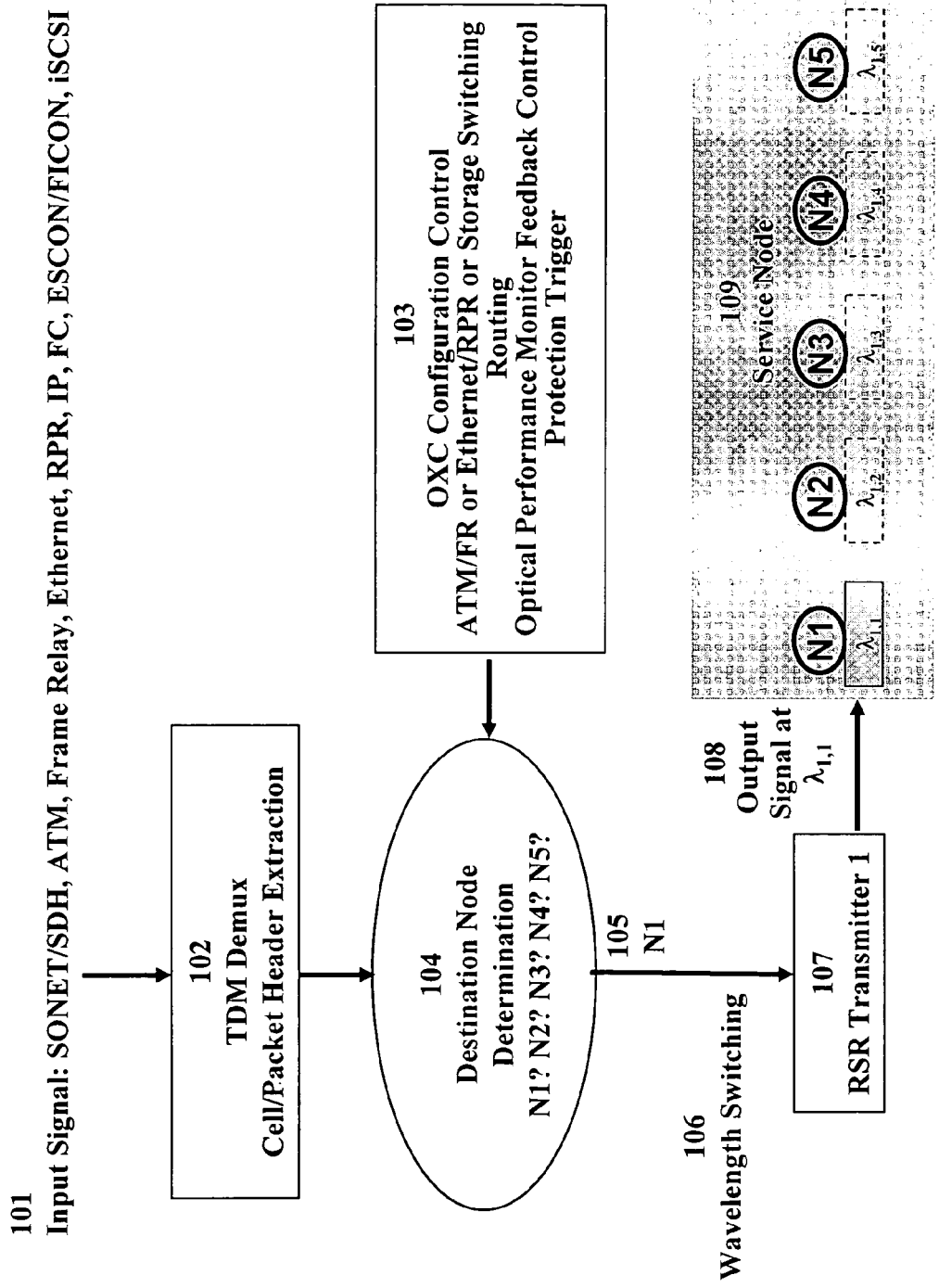
FIG. 6 is a graphical diagram illustrating RSR technology applications to optical circuit and packet switching and optical packet routing in accordance with the present invention.

FIG. 6 100 illustrates the implementations of RSR for optical circuit and packet switching, and optical packet routing. The input TDM or cell or packet signal 101 to the first RSR transmitter 107 is first electronically de-multiplexed, and header information extracted for cell/packet signals 102. Then the destination node 104 where source information needs to be routed to, is determined for each TDM circuit (time slot) or data packet according to their OXC configuration, or layer 2 switching such as Ethernet, or storage switching such as FC/iSCSI, or layer 3 routing such as IPv4/IPv6 103. The destination node can also be determined by feedback control of optical performance monitor and/or protection trigger 103. If the circuit/packet needs to go to the first service node 109, based on the destination output N1 105, the wavelength switching 106 is done though RSR transmitter 107, which in this case will be set to $\lambda_{1,1}$ 108.

The above embodiments are only illustrative of the principles of this invention and are not intended to limit the invention to the particular embodiments described. Although the RSR configuration and operation method described in the present invention is in the context of a metropolitan network, the RSR is applicable to other networks including a long haul network and an access network. Accordingly, various modifications, adaptations, and combinations of various features of the described embodiments can be practiced without departing from the scope of the invention as set forth in the appended claims.

We claim:

1. An optical reconfigurable service ring (RSR) architecture based on a RSR channel and WDM channel plan matrix, comprising:

a set of tunable RSR channels, each tunable RSR channel covers one group of predefined and adjacent WDM channels, and each tunable RSR channel is within a tuning range of a narrowly tunable optical channel transmitter;

a set of the narrowly tunable optical transmitters, wherein the frequency or the wavelength of each narrowly tunable optical transmitter can be tuned by electrical, thermal, optical, mechanical or any other means, to cover one of the several and adjacent WDM channels it includes, and each narrowly tunable optical transmitter covers a different group of WDM channels whose group frequencies are not overlapping;

a gateway hub, having an optical input coupled to the output of a last optical fiber span and an optical output coupled to an input of a first optical fiber span, for providing optical multiplexing and demultiplexing for all the WDM channels included by all the tunable RSR channels;

a set of service nodes, each having an optical input coupled to an output of a first optical fiber span and an optical output coupled to an input of a second optical fiber span, for providing optical add and drop to a set of WDM channels, wherein all WDM channels add/drop to a service node belong to different tunable channels, and every service node on the optical RSR ring adds and drops a different set of WDM channels;

wherein a switching or routing mechanism changes the service node it reaches when the narrowly tunable optical transmitters at the hub are tuned among the WDM channels, as each service node only accesses one particular WDM channel from each tunable RSR channel.

2. The optical reconfigurable service ring architecture of claim 1 being applied to a metropolitan network.

3. The optical reconfigurable service ring architecture of claim 1 being applied to an access network.

4. The optical reconfigurable service ring architecture of claim 1 being applied to a long haul backbone network.

5. The optical reconfigurable service ring architecture of claim 1 being used to offer provisional wavelength services of any bit rate, any format, and any protocol.

6. The optical reconfigurable service ring architecture of claim 1 being used to perform optical circuit switching, optical layer packet switching, optical storage switching, and optical layer packet routing, as well as optical circuit/packet switching based on external feedbacks and protection trigger.

7. The optical reconfigurable service ring architecture of claim 1 requiring no synchronous receiver shuttering during its reconfiguration, since no in-between channels are carrying traffic during reconfiguration.

8. A method for operating the optical reconfigurable service ring architecture of claim 1, comprising the steps of:

first, turning on and tuning all tunable transmitters to its full tuning range, aligning each of the WDM channels to their corresponding OADM channels on all service nodes, and storing each WDM channel's tuning positions in transmitter initialization files;

second, turning on and tuning certain tunable transmitters to one of its WDM channels stored in the initialization files, according to number of channels demanded by each service node;

third, if service demand changes, operating the is changed, turning on and tuning certain tunable transmitters per second step, according to the new service demand.

* * * * *